(12) United States Patent
Daschner

(10) Patent No.: US 8,926,439 B2
(45) Date of Patent: Jan. 6, 2015

(54) SUCTION TUBE ARRANGEMENT WITH IMPROVED ACTUATING SHAFT

(71) Applicant: Audi AG, Ingolstadt (DE)

(72) Inventor: Rene Daschner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/913,118

(22) Filed: Jun. 7, 2013

(65) Prior Publication Data

US 2013/0341546 A1 Dec. 26, 2013

Related U.S. Application Data

(63) Continuation of application No. 13/229,990, filed on Sep. 12, 2011, now abandoned.

(30) Foreign Application Priority Data

Sep. 13, 2010 (DE) .......................... 10 2010 045 215

(51) Int. Cl.
F02D 9/10 (2006.01)
F02B 31/06 (2006.01)
F02B 27/02 (2006.01)
F16K 31/44 (2006.01)

(52) U.S. Cl.
CPC ................. *F16K 31/44* (2013.01); *F02B 31/06* (2013.01); *F02D 9/108* (2013.01); *F02B 27/0284* (2013.01); *F02D 9/107* (2013.01); *F02D 9/1085* (2013.01); *Y02T 10/146* (2013.01); *F02D 9/1095* (2013.01); *F02D 9/1065* (2013.01)

USPC ............ 464/181; 464/182; 123/336; 264/255

(58) Field of Classification Search
USPC ................. 464/151, 181, 182; 29/428, 527.1; 123/336; 264/255
See application file for complete search history.

(56) References Cited

U.S. PATENT DOCUMENTS

| 6,167,867 | B1 | 1/2001 | Garrick | |
|---|---|---|---|---|
| 6,612,325 | B2 * | 9/2003 | Rentschler et al. | ....... 123/336 X |
| 6,763,802 | B1 * | 7/2004 | Brassell | ......... 123/336 |
| 7,325,530 | B2 * | 2/2008 | Vichinsky | ..... 123/336 |

FOREIGN PATENT DOCUMENTS

| DE | 195 36 947 | 4/1997 |
|---|---|---|
| DE | 199 18 777 | 10/2000 |
| DE | 101 14 994 | 10/2001 |
| DE | 102 40 316 | 3/2004 |
| DE | 102006052094 | 7/2006 |
| DE | 102008055628 | 5/2010 |

* cited by examiner

*Primary Examiner* — Gregory Binda
*Assistant Examiner* — Matthieu Setliff
(74) *Attorney, Agent, or Firm* — Henry M Feiereisen LLC

(57) ABSTRACT

A suction tube arrangement includes a suction tube having a suction tube opening and an actuating shaft which is received in the suction tube. The actuating shaft has a base body made of a first material and an actuating shaft body made of a second material and at least partially applied on the base body. The base body or the actuating shaft body forms at least one cover element to open or close the suction tube opening as a function of a rotation of the actuating shaft. An actuating element is at least partially enclosed by the actuating shaft body for actuating the actuating shaft.

15 Claims, 2 Drawing Sheets

SUCTION TUBE ARRANGEMENT WITH IMPROVED ACTUATING SHAFT

CROSS-REFERENCES TO RELATED APPLICATIONS

This application is a continuation of prior filed U.S. application Ser. No. 13/229,990, filed Sep. 12, 2011, now abandoned the priority of which is hereby claimed under 35 U.S.C. 120 and which claims the priority of German Patent Application Serial No. 10 2010 045 215.7, filed Sep. 13, 2010, pursuant to 35 U.S.C. 119(a)-(d), the contents of which are incorporated herein by reference in their entirety as if fully set forth herein.

BACKGROUND OF THE INVENTION

The present invention relates to an actuating shaft, in particular of a suction tube arrangement, with an actuating element for operating the actuating shaft. The invention also relates to a method for producing an actuating shaft.

The following discussion of related art is provided to assist the reader in understanding the advantages of the invention, and is not to be construed as an admission that this related art is prior art to this invention.

Actuating shafts are used, in particular, for suction tube arrangements where at least one suction tube opening can be closed and opened with at least one cover element arranged on the actuating shaft or actuatable by the actuating shaft. The actuating shaft is typically supported for rotation about a rotation axis. For this purpose, at least one bearing may be associated with the actuating shaft. The actuating shaft can hereby be moved to an arbitrary rotation angle position within a predetermined angular range. The actuating element which is used to actuate the actuating shaft is provided for this purpose. Typically, a drive cooperates with the actuating element for actuating the actuating shaft and moving the actuating shaft to the desired rotation angle position. The actuating element is thus provided to apply the torque from the drive to the actuating shaft. For example, the actuating element can be operatively connected with the drive by way of a coupling linkage. The actuating element serves herein as carrier element.

Conventional actuating elements are constructed as ball-shaped heads coupled to a coupling linkage and constructed as a single piece in conjunction with an section of the shaft of the throttle element. However, this results in a comparatively high manufacturing complexity, because the ball-shaped head is already formed, for example, during and in conjunction with the manufacture of the section. In addition, a cover plate must be formed on the shaft. Several manufacturing steps are therefore required for producing the throttle element.

It would therefore be desirable and advantageous to obviate prior art shortcomings and to provide an improved actuating shaft which can be manufactured more cost-effectively.

SUMMARY OF THE INVENTION

According to one aspect of the present invention, an actuating shaft, in particular of a suction tube arrangement, includes an actuating element for actuating the actuating shaft, a base body made of a first material, and an actuating shaft body made of a second material and at least partially applied on the base body, said actuating shaft body at least partially enclosing the actuating element.

During the manufacture of the actuating shaft, a cover element of the actuating shaft is formed and the actuating element is fastened on the actuating shaft simultaneously. This is attained according to the invention by constructing the actuating shaft from a base body made of a first material and an actuating shaft body disposed on the base body and made of a second material. In addition, the actuating element should be at least partially surrounded by the actuating shaft body. The actuating shaft thus basically includes a base body, the actuating shaft body and the actuating element; however, it will be understood that several base bodies, actuating shaft bodies and actuating elements may be present. The base body is made of a first material, for example a metal, in particular steel. The base body may in principle have any suitable shape, for example be embodied as a substantially straight rod or in form of a crankshaft, wherein in the latter case at least a region of the base body is located outside a rotation axis of the actuating shaft or spaced from the rotation axis in the radial direction.

The actuating shaft body is applied on the base body. The actuating shaft body is made of a second material which preferably is different from the first material. The second material is, for example, a plastic. The actuating shaft body is applied on the base body so that the actuating element is at least partially disposed in the actuating shaft body, so that the actuating element is held by the actuating shaft body and fixed with respect to the base body, in particular with a rotation lock. To attain a particularly torque-proof connection between the actuating element and the base body, the actuating element may have a serration extending in a substantially axial direction in the region enclosed by the actuating shaft body. The actuating shaft body need not cover the entire base body, but may only be partially disposed on the base body. It will be understood that an additional layer, for example made of an elastomer, maybe deposited on the base body and/or the actuating shaft body, which may operate as a sealing layer to ensure that the at least one suction tube opening is safely covered by the cover element of the actuating shaft.

According to one advantageous feature of the present invention, at least one region of the actuating element may at least partially circumferentially surround the base body of the actuating shaft. For this purpose, the actuating element may have a recess configured to at least partially receive the base body. To ensure that the actuating element is firmly attached on the actuating shaft, the actuating element may at least partially surround the base body, while the actuating element is in turn surrounded by the actuating shaft body. Surrounding the actuating element with the base body secures the actuating element relative to the base body at least in the radial direction. Surrounding the actuating element with the actuating shaft body secures the actuating element relative to the base body in the axial direction. Surrounding the actuating element with the actuating shaft body thus prevents the actuating element from sliding off the base body. Preferably, the actuating element completely surrounds the base body in the circumferential direction.

According to one advantageous feature of the present invention, a clamping connection may be provided between the actuating element and the base body of the actuating shaft, thereby establishing a particularly reliable connection between the actuating element and the base body. The recess with which the base body at least partially circumferentially surrounds the actuating element is, for example, centrally formed in the actuating element. The recess may thereby be implemented as a blind hole, i.e., a hole that does not completely extend through the actuating element in the axial direction. Alternatively, the recess may also be implemented as a through-opening, with the recess fully extending through the actuating element in the axial direction.

According to another advantageous feature of the present invention, the actuating element may have a ball-shaped head, wherein the recess at least partially extends through the ball-shaped head. The ball-shaped head is hereby disposed on a side of the actuating element facing away from the base body. In particular, the ball-shaped head is used to provide an operative connection to a drive. For example, the ball-shaped head may be surrounded at least partially by a coupling linkage which is operatively connected with the drive.

According to yet another advantageous feature of the present invention, the recess may extend completely through the ball-shaped head. In this way, an engagement opening may be provided on the side of the ball-shaped head facing away from the base body which may be used, for example, for centering. After the actuating shaft is installed and connected with the drive, in particular by way of the coupling linkage, the recess or the engagement opening may be closed. This can be done, for example, with a plug which clampingly engages in the engagement opening.

According to yet another advantageous feature of the present invention, the first material may be a metal, in particular steel, and/or the second material may be a plastic, in particular a polymer. The actuating shaft can then be particularly easily manufactured and the actuating element can be reliably secured relative to the base body. The first material is preferably rigid and torsion-proof. The second material is preferably a moldable material which also adheres to the first material.

According to still another advantageous feature of the present invention, a blind hole, in particular a blind hole formed by the recess, may be provided in the ball-shaped head, wherein the bottom of the blind hole is defined, in particular, by the base body. The term "blind hole" refers to a recess which does not completely extend through the ball-shaped head or the entire actuating element, but instead has a bottom. The blind hole may be used, for example, for centering. Advantageously, the blind hole may be formed by the recess. The bottom of the blind hole may be defined by the base body. This means that the recess initially extends completely through the ball-shaped head and/or the actuating element in the axial direction. The actuating element is then arranged so as to at least partially circumferentially surround the base body. The base body is then at least partially disposed in the recess of the actuating element and forms the bottom of the blind hole.

According to another advantageous feature of the present invention, the actuating element may include at least one tongue-and-groove element engaging with the actuating shaft body, in particular in form of a radial collar. The at least one tongue-and-groove element is provided for, in particular, securely affixing the actuating element in the radial direction relative to the base body of the actuating shaft. The tongue-and-groove element protrudes into the actuating shaft body so as to form a positive connection between the actuating element and the actuating shaft body. The tongue-and-groove element can be implemented as a radial collar extending outwardly in the radial direction.

According to another advantageous feature of the present invention, the actuating element may include at least one sealing element, in particular implemented as a radial projection and/or aligned with the actuating shaft body in the radial direction. The sealing element is provided to define the actuating shaft body in at least one direction during manufacture of the actuating shaft. Such design of the actuating element is advantageous in particular when the second material of which the actuating shaft body is made is produced with an injection molding process, because then there is no need for additional sealing measures in the region of the actuating element. The sealing element may be, for example, a radial projection.

According to yet another advantageous feature of the present invention, the sealing element may be aligned in the radial direction with the actuating shaft body. In other words, the sealing element of the actuating element may extend, starting from the base body or its center, in the radial direction approximately to the same distance as the actuating shaft body. The surface of the sealing element may be aligned with the surface of the actuating shaft body at least in the region where the actuating shaft body makes contact with the sealing element.

According to another advantageous feature of the present invention, at least one cover element may be formed by the base body and/or the actuating shaft body. The cover element is used, as already described above, for covering or for uncovering a suction tube opening of the suction tube arrangement. The cover element may be implemented as a flap. The cover element may be formed either by the base body, the actuating shaft body or a combination thereof. According to one embodiment, the cover element may be formed by the actuating shaft body, wherein the second material may be selected to ensure an excellent sealing effect of the cover element. For attaining a good sealing effect, a third material may be at least partially deposited on the base body and/or the actuating shaft body, or on the cover element. Advantageously, the third material is an elastomer or a polymer.

The invention also relates to a method for producing an actuating shaft with an actuating element for actuating the actuating shaft. The actuating shaft may be produced from a base body made of a first material and an actuating shaft body made of a second material and applied at least partially on the base body, wherein the actuating element is at least partially enclosed by the actuating shaft body. The method for producing an actuating shaft with an actuating element for actuating the actuating shaft includes the steps of providing the base body and the actuating element, arranging the actuating element in relation to the base body, and subsequently applying the second material on the base body and the actuating element to form the actuating shaft body. The second material is preferably applied with an injection molding process. When the actuating shaft is produced, the actuating elements should be at least partially surrounded and overmolded with the second material.

According to an embodiment of the invention, application of the actuating shaft body on the base body and enclosing the actuating element are performed substantially simultaneously, in particular during an injection molding process. Accordingly, no consecutive process steps are implemented for forming the actuating shaft body and for attaching the actuating element. Instead, this is performed during a single process step which is preferably performed with an injection molding process. The actuating shaft body is then molded on the base body so that the position of the actuating element with respect to the base body is fixed.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
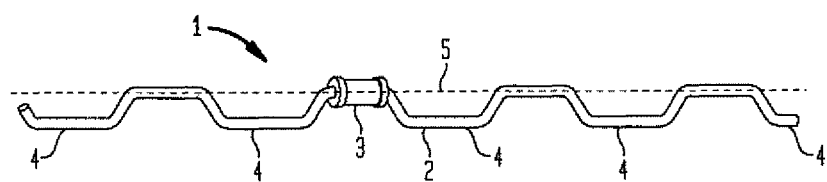
FIG. 1 shows a base body of an actuating shaft according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an actuating shaft 1, wherein only a base body 2 of the actuating shaft 1 and a bearing sleeve 3 are illustrated. The base body 2 is made, for example, of metal, in particular steel. In the embodiment illustrated in FIG. 1, the base body 2 is shaped as a crankshaft and has at least one, in the illustrated embodiment, several regions 4 which are spaced from a rotation axis 5 in the radial direction. The first process steps in a manufacturing process for manufacturing the actuating shaft 1 include providing the illustrated base body 2 and applying the at least one bearing sleeve on the base body 2.

Figure 2:
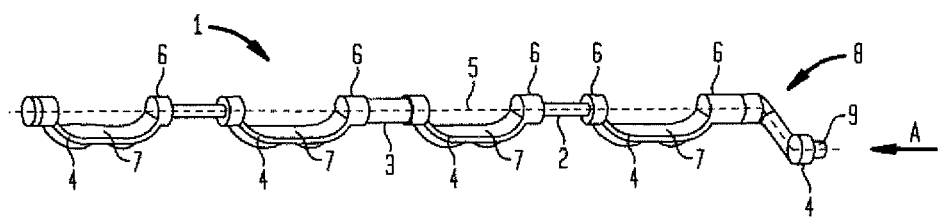
FIG. 2 shows the base body, an actuating element and an actuating shaft body applied at least partially on the base body and the actuating element, according to the present invention.
Figure 3:
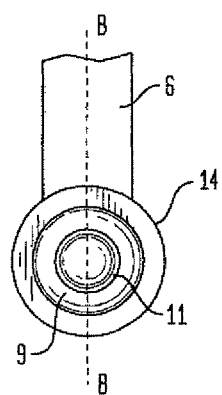
FIG. 3 shows an end view of a right end of the actuating shaft according to the present invention as seen in direction of arrow A.
Figure 5:
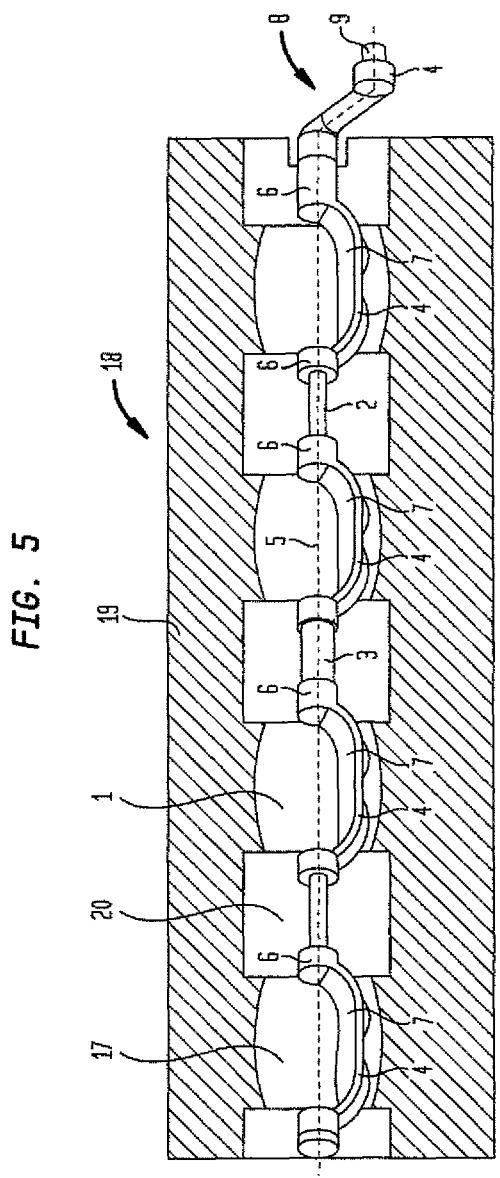
FIG. 5 shows a suction tube arrangement having incorporated therein an actuating shaft according to the present invention.

FIG. 2 shows the actuating shaft 1 after additional steps of the manufacturing process. As can be seen, an actuating shaft body 6 is at least partially applied on the base body 2 on the right axial end so as to extend along its axial length and surrounds it from outside in a circumferential direction. The actuating shaft body 2 typically does not completely enclose the base body 2. Instead, regions of the base body remain uncovered, in particular in the region of the rotation axis 5. The actuating shaft body 6 forms cover elements 7 in the regions 4 of the base body 2 which are spaced from the rotation axis 5. As shown in FIG. 5 the cover elements 7 cooperate for example, with suction tube openings 17 disposed in a section tube 18 of a suction tube arrangement 19 associated with the actuating shaft 1. The cover elements 7 are used to either uncover or cover, i.e. close, the suction tube openings 17.

To this end, the actuating shaft 1 can be moved to at least two rotation angle positions in a predetermined angular position range, wherein the suction tube openings 17 are closed by the cover elements 7 in the first rotation angle position and uncovered in the second rotation angle position. Advantageously, the actuating shaft 1 can be moved to any rotation angle position within the angular range for adjusting coverage of the suction tube openings 17 by the cover elements 7, in particular by closed-loop control and/or open-loop control.

The actuating shaft body 6 is applied on the base body 2 so as to provide a torque-proof connection therebetween. The actuating shaft body 6 can also be used to secure the bearing sleeve 3 on the base body 2, with the actuating shaft body 6 at least partially enclosing the bearing sleeve 3, in particular on both sides of the bearing sleeve 3.

An actuating element 8 is provided for actuating the actuating shaft 1. In the present exemplary embodiment, the actuating element 8 is arranged at one of the base body 2 and in one of the regions 4, i.e., spaced from the rotation axis 5 in the radial direction. The actuating element 8 has a ball-shaped head 9 which is, for example, constructed to be operatively connected with a drive of the actuating shaft 1 via a coupling linkage. Accordingly, a torque from the drive can be applied to the actuating shaft 1 via the actuating element 8, wherein the torque causes the actuating shaft 1 to rotate to the desired rotation angle position. The actuating shaft 1 then rotates about its rotation axis 5. A support 20 (FIG. 2a) made, for example, of plastic for the actuating shaft 1 is provided in the region of the bearing sleeve 3. The bearing sleeve 3 is placed for support in an unillustrated bearing seat, thereby forming a radial bearing for the actuating shaft 1.

Figure 4:
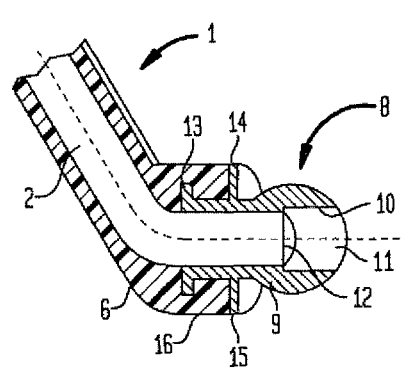
FIG. 4 shows a detailed cross-section view of the actuating shaft in the region of the actuating element, in a cross-section taken along the line B-B in FIG. 3.

FIG. 4 shows a detailed cross-sectional view of the actuating shaft in the region of the actuating element 8. As can be clearly seen, the region of the base body 2 projects into a recess 10 of the actuating element 8. Accordingly, the actuating element 8 at least partially circumferentially surrounds the base body 2. The recess 10 is formed so as to completely extend in the axial direction through the entire actuating element 8 and hence also through the ball-shaped head 9. However, the base body 2 does not completely extend through the actuating element 8 and the recess 10, respectively, so that a blind hole 11 formed by the recess 10 is disposed in the ball-shaped head 9. A bottom 12 of the blind hole 11 is defined by the base body of the actuating shaft 1, with the blind hole 11 being used, in particular, for centering. Alternatively, the blind hole 11 may be closed after installation of the actuating shaft 1, for example with a plug. The recess 10 is advantageously dimensioned so as to clampingly hold the base body 2 in the recess 10. This means that the inside dimensions of the recess 10 are at least slightly smaller than the outside dimensions of the base body 2.

FIG. 5 also shows the actuating element 8 enclosed by the actuating shaft body 6 on the right axial end. The actuating shaft body 6 is, for example, molded on the base body 2. The base body 2 is here made of a first material, which may for example be a metal, whereas the actuating shaft body 6 is made of a second material which is in particular a plastic. The second material is typically different from the first material.

To attain a reliable seat of the actuating element 8 on the actuating shaft 1, the actuating element 8 has a tongue-and-groove element 13 which engages with the actuating shaft body and may have the form of a radial collar. This prevents the actuating shaft body 6 from removing the actuating element 8 from the base body 2. The tongue-and-groove element 13 also forms a tongue-and-groove connection with the actuating shaft body 6. The tongue-and-groove element 13 is thus used to affix the actuating element 8 with respect to the base body in the axial direction.

The actuating element 8 may additionally have a serration in the region enclosed by the actuating shaft body 6, which serration extends substantially in the direction of the rotation axis 5 or at least at an angle to a circumferential direction. The actuating element is thereby safely affixed relative to the base body 2 also in the circumferential direction. Engagement of the base body 2 in the recess 10 of the actuating element 8 provides a lock in the radial direction. The actuating element 8 is then securely held in all spatial directions against displacement relative to the base body 2.

To simplify the manufacture of the actuating shaft 1, the actuating element 8 includes at least one sealing element 14, which delimits the length of the actuating shaft body in the axial direction towards the ball-shaped head 9. The sealing element 14 is hereby formed as a radial projection. Preferably, the sealing element 14 or an outer circumference 15 of the sealing element 14 is aligned with a surface 16 of the actuating shaft body 6. Alternatively, the outer circumference 15 of the sealing element 14 may also be enclosed by the actuating shaft body 6.

In the manufacture of the actuating shaft 1, application of the actuating shaft body 6 on the base body 2 and fixation of the actuating element 8 relative to the base body 2 may be performed essentially simultaneously, i.e. in a single process step. For this purpose, the actuating shaft body 6 may be applied on the base body 2 with an injection molding process, with the actuating element 8 already being placed on the base body 2 ahead of time. In this way, an additional process step which would otherwise be required for securing the actuating element 8 on the base body or the actuating shaft body 6 can be eliminated. This enables a very cost-effective manufacture of the actuating shaft 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A suction tube arrangement, comprising
   a suction tube having a suction tube opening;
   an actuating shaft rotatable around a rotation axis and received in the suction tube, said actuating shaft having a base body made of a first material and an actuating shaft body which is made of a second material different from the first material and which is at least partially applied on the base body and forms at least one cover element to open or close the suction tube opening as a function of a rotation of the actuating shaft; and
   an actuating element for actuating the actuating shaft, wherein said actuating shaft body at least partially encloses the actuating element along its axial length from outside in a circumferential direction, wherein said actuating element comprises a recess configured to at least partially receive the base body, said actuating element having at least one region which at least partially circumferentially surrounds the base body of the actuating shaft.

2. The suction tube arrangement of claim 1, wherein the actuating element comprises a ball-shaped head, said recess at least partially extending through the ball-shaped head.

3. The suction tube arrangement of claim 1, wherein the first material is metal.

4. The suction tube arrangement of claim 2, wherein the metal is steel.

5. The suction tube arrangement of claim 1, wherein the second material is plastic.

6. The suction tube arrangement of claim 1, wherein the recess is a blind hole.

7. The suction tube arrangement of claim 6, wherein a bottom of the blind hole is defined by the base body.

8. The suction tube arrangement of claim 1, wherein the actuating shaft body is made in one piece with the cover element.

9. The suction tube arrangement of claim 1, further comprising a bearing sleeve secured by the actuating shaft on the base body for forming a radial bearing for the actuating shaft.

10. The suction tube arrangement of claim 9, further comprising a support made of the second material and provided in the region of the bearing sleeve.

11. A suction tube arrangement, comprising
    a suction tube having a suction tube opening;
    an actuating shaft rotatable around a rotation axis and received in the suction tube, said actuating shaft having a base body made of a first material and an actuating shaft body which is made of a second material different from the first material and which is at least partially applied on the base body and forms at least one cover element to open or close the suction tube opening as a function of a rotation of the actuating shaft; and
    an actuating element for actuating the actuating shaft, wherein said actuating shaft body at least partially encloses the actuating element along its axial length from outside in a circumferential direction, wherein the actuating element comprises at least one tongue-and-groove element engaging in the actuating shaft body.

12. The suction tube arrangement of claim 11, wherein the tongue-and-groove element is formed as a radial collar.

13. A suction tube arrangement, comprising
    a suction tube having a suction tube opening;
    an actuating shaft rotatable around a rotation axis and received in the suction tube, said actuating shaft having a base body made of a first material and an actuating shaft body which is made of a second material different from the first material and which is at least partially applied on the base body and forms at least one cover element to open or close the suction tube opening as a function of a rotation of the actuating shaft; and
    an actuating element for actuating the actuating shaft, wherein said actuating shaft body at least partially encloses the actuating element along its axial length from outside in a circumferential direction, wherein the actuating element comprises at least one sealing element.

14. The suction tube arrangement of claim 13, wherein the at least one sealing element is constructed as a radial projection.

15. The suction tube arrangement of claim 13, wherein the at least one sealing element is aligned with the actuating shaft body in a radial direction.

\* \* \* \* \*